United States Patent
Severin

[11] Patent Number: 6,042,054
[45] Date of Patent: Mar. 28, 2000

[54] EMERGENCY ESCAPE METHOD FOR AN AIRCRAFT CREW

[75] Inventor: Gai Ilich Severin, Moscow, Russian Federation

[73] Assignee: Otkrytoe Aktsionernoe Obschestvo Nauchno Proizvodstvennoe, Predpriyatie Zvezda, Russian Federation

[21] Appl. No.: 09/011,669

[22] PCT Filed: Aug. 15, 1995

[86] PCT No.: PCT/RU95/00172

§ 371 Date: Feb. 13, 1998

§ 102(e) Date: Feb. 13, 1998

[87] PCT Pub. No.: WO97/07022

PCT Pub. Date: Feb. 27, 1997

[51] Int. Cl.[7] ................................................ B64D 25/10
[52] U.S. Cl. ................................................ 244/122 AE
[58] Field of Search ..................... 244/122 AB, 122 A, 244/122 AE, 122 AC, 141, 150, 122 AH, 147, 137.2, 149

[56] References Cited

U.S. PATENT DOCUMENTS

| | | |
|---|---|---|
| 1,906,091 | 4/1933 | Pendergast et al. .................. 244/147 |
| 2,671,622 | 3/1954 | Saulnier .............................. 244/122 A |
| 3,014,678 | 12/1961 | Stencel ................................. 244/147 |
| 3,542,319 | 11/1970 | Duncan et al. ....................... 244/141 |
| 4,709,885 | 12/1987 | Martin .................................. 244/141 |
| 5,104,066 | 4/1992 | Aronne ............................ 244/122 AE |

*Primary Examiner*—Peter M. Poon
*Assistant Examiner*—Francis T Palo
*Attorney, Agent, or Firm*—Ostrolenk, Faber, Gerb & Soffen, LLP

[57] ABSTRACT

The invention relates to means for the emergency abandonment of an aircraft and makes it possible to create a super-light and effective system for emergency abandonment which can be used in aircraft with a flight speed of 500–600 km/hour. This is achieved by at first catapulting a parachute pack (7) by means of an ejection mechanism (6) and then catapulting a member of the crew using an ejection mechanism (2). In order to ensure safety in the case of pair catapulting, the direction of catapulting of the parachute pack and the member of the crew is at an angle of 15–20° relative to the plane of symmetry of the aircraft. Furthermore, the parachute pack is used as a means for breaking the transparency of the cockpit.

5 Claims, 3 Drawing Sheets

EMERGENCY ESCAPE METHOD FOR AN AIRCRAFT CREW

FIELD OF THE INVENTION

The invention relates to means for emergency abandonment and can be used to save the crew in the case of aircraft breakdown.

BACKGROUND ART

A method is known for abandonment of an aircraft by using a tractor rocket engine which pulls a crew member out by means of a tractor cable, and then using a parachute.

A method is also known for saving members of a crew using a catapult seat, the method comprising catapulting a member of the crew from the cabin together with the seat, and subsequently opening a parachute located in the seat and separating the crew member from the seat.

These methods have two basic drawbacks. In the first place, the parachute is put into operation with some delay in time after the seat with the pilot has gone a certain distance from the aircraft. In the second place, these methods can only be realized by means of systems having a sufficiently large mass, but this is unacceptable for realizing such methods on light aircraft.

DISCLOSURE OF THE INVENTION

The object of the invention is to create a very light and effective system for the emergency abandonment of an aircraft by a member of the crew, which can be used with aircraft having a flight speed up to 500–600 km/hour.

In order to achieve the indicated object, a method is proposed for the emergency abandonment from an aircraft which comprises catapulting a member of the crew and a rescue parachute. At first, a pack with the parachute is catapulted and then a member of the crew.

Catapulting the member of the crew is carried out behind a suspension-linkage system by means of an ejection mechanism, wherein the force of the latter is directed through the center of gravity of the member of the crew.

Furthermore the catapulting speed and the sequence of operation of the ejection mechanisms are so chosen that at the moment the member of the crew is separated from the aircraft, the free ends and shroud lines of the parachute are stretched to their full length.

In the case of catapulting pairs, in order to ensure safety, the direction of catapulting the parachute pack and member of the crew is at an angle of 15–20° relative to the plane of symmetry of the aircraft, and if necessary the catapulted parachute pack may be used as a means for breaking the transparency of the cockpit canopy of the aircraft.

BRIEF DESCRIPTION OF THE DRAWINGS

The instant invention is explained by the drawings where.

Figure 1:
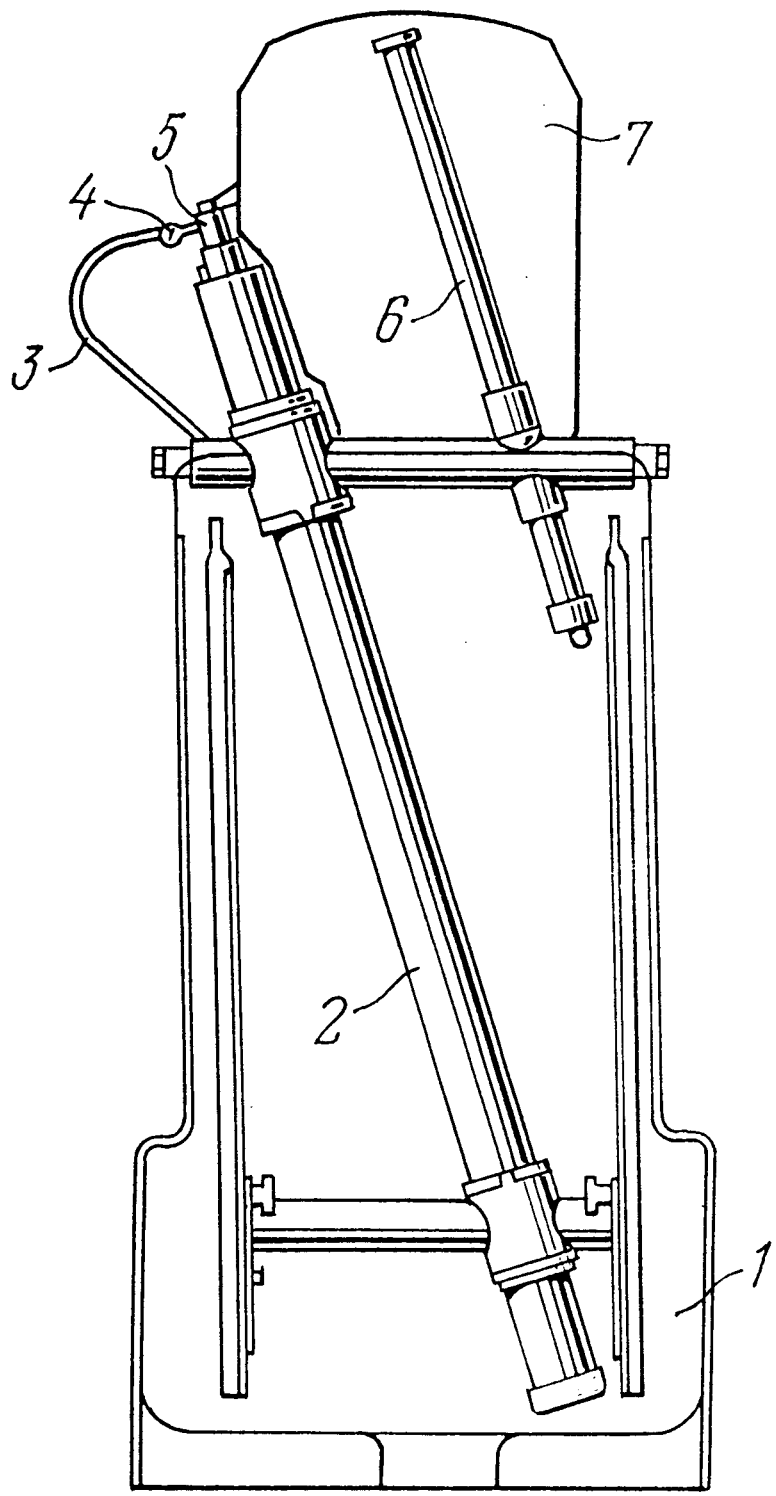
FIG. 1 shows a schematic diagram of a presupposed device for carrying out the method.
Figure 2:
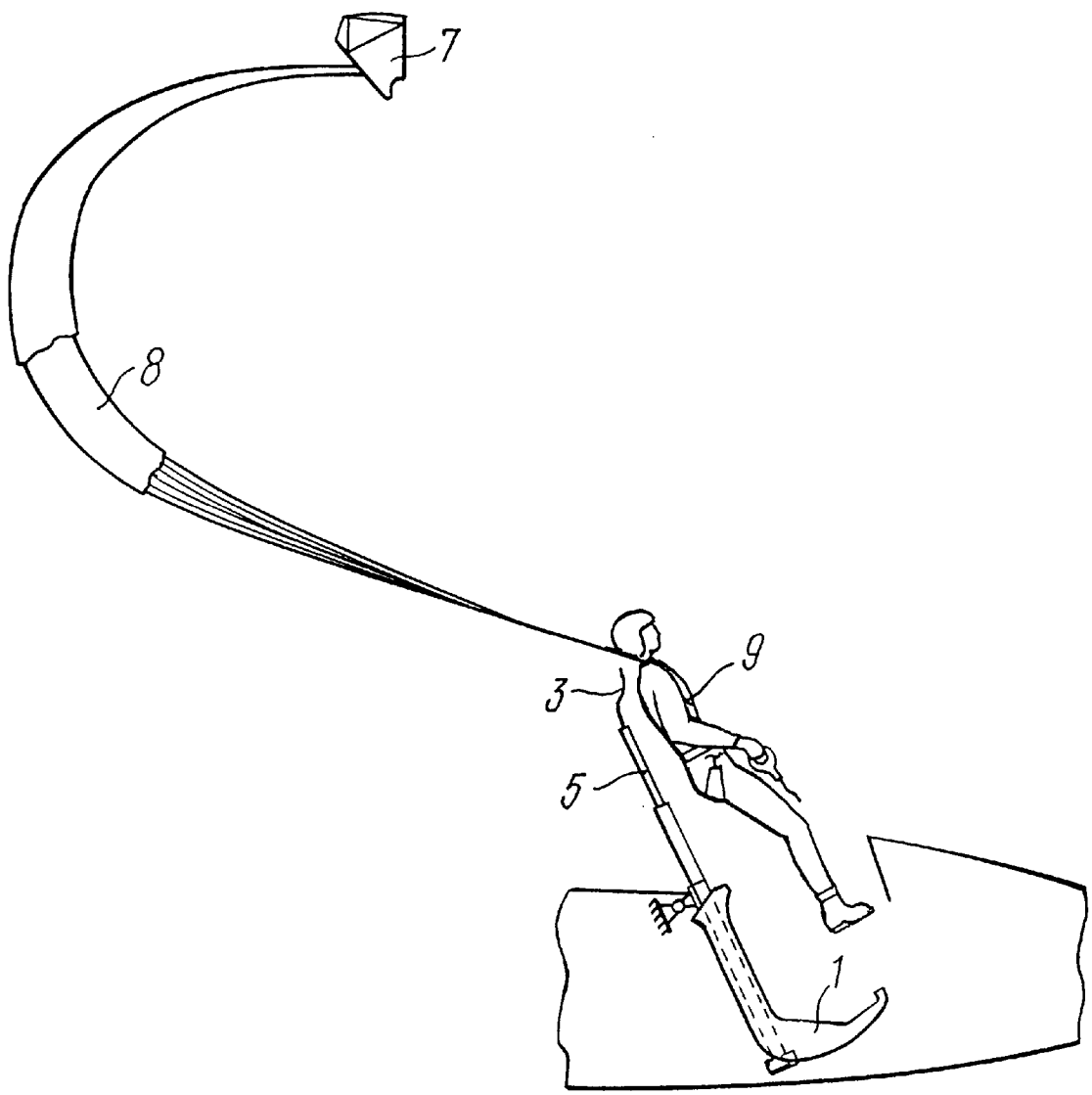
FIG. 2 shows the moment of separation of a member of the crew from an aircraft.
Figure 3:
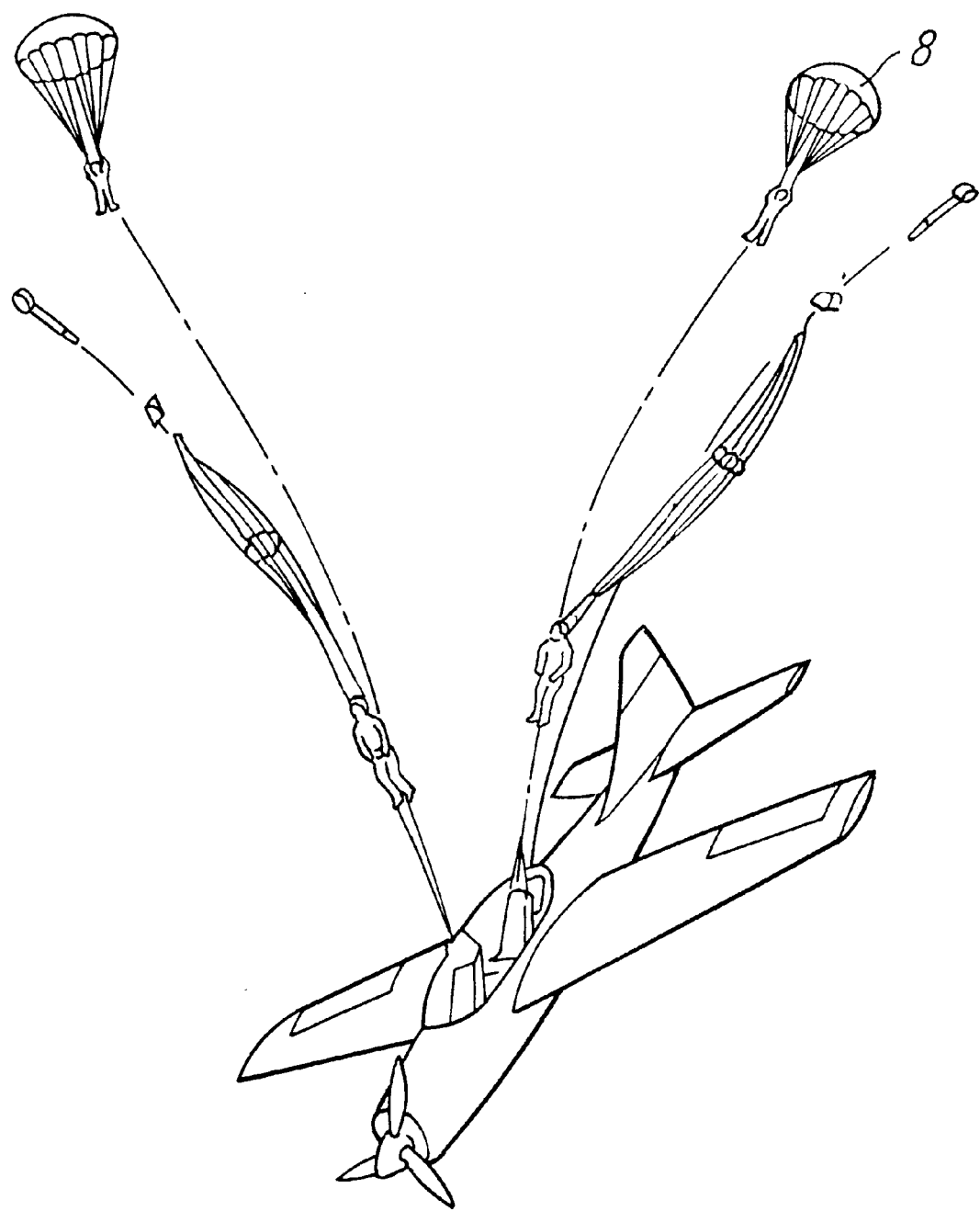
FIG. 3 shows a scheme for pair abandonment from an aircraft.

The presupposed invention as shown in FIG. 1 comprises a seat 1, a mechanism 2 for ejecting a member of the crew, a towing bridle 3 and a lock 4, which are connected to the upper part of an internal tube 5 of the mechanism ejecting the member of the crew and a suspension-linkage system of the crew member 9 (FIG. 2).

Two ejection mechanisms are arranged behind the back of the seat: one for catapulting the member of the crew and the other, ejection mechanism 6, for catapulting the parachute pack.

When the catapulting drive is actuated, the telescopic ejection mechanism 6 for the parachute pack 7 (FIG. 1) is put into action. During the first part of the predetermined movement of that mechanism, the telescopic ejection mechanism 2 (FIG. 1) is actuated by means of mechanical coupling, and a member of the crew is catapulted by means of mechanism 2. During further movement of the parachute pack 7 (FIG. 2), the transparency of the cockpit canopy is broken and then the shroud lines are stretched out and the canopy of the parachute 8 is opened (FIG. 2).

At the beginning of the movement of the ejection mechanism 2 (FIG. 1) for the member of the crew, the suspension-linkage system 2 (FIG. 1) is automatically disconnected from the seat 1 (FIG. 1) and, further, the ejection mechanism 2 transmits a speed to the member of the crew which is sufficient to ensure a safe trajectory of his movement in respect of the aircraft. In order to ensure normal functioning of the system, the speed of catapulting the parachute pack should be 30–40 m/sec, while the speed transmitted to the member of the crew by the ejection mechanism should be about 10–15 m/sec.

BEST METHOD OF CARRYING OUT THE INVENTION

The Applicant produced a prototype of the presupposed apparatus ensuring the proposed method for emergency abandonment of an aircraft by the crew.

The results of ground and flight tests showed that the proposed method ensures reliable and safe emergency abandonment of single-seater and double-seater light aircraft by the crew at a range of flight speeds from 50 to 400 km/hour and at heights up to 4 km.

INDUSTRIAL APPLICABILITY

The prototype of the presupposed apparatus was tested many times. The experimental catapulting of a dummy from a cockpit confirmed the safety of that method for both the pilot piloting the plane from a rear cockpit and for the plane as a whole.

I claim:

1. A method for the emergency abandonment of an aircraft by the crew, the method comprising catapulting a member of the crew and a parachute pack, characterized in that at first the parachute pack is catapulted by a first ejection mechanism and then the member of the crew behind a suspension-linkage system by a second ejection mechanism, wherein the force of the latter is directed through the center of gravity of the member of the crew.

2. A method as claimed in claim 1, characterized in that the sequence of operation of the ejection mechanisms and the catapulting speed of the parachute pack and the crew member are so chosen that at the moment the member of the crew is separated from the aircraft the free ends and shroud lines of the parachute are stretched to their full length.

3. A method according to claim 1, characterized in that the direction of catapulting the parachute pack and the member of the crew is at an angle of 15–20° relative to the plane of symmetry of the aircraft.

4. A method according to claim 1, characterized in that the transparency of the cockpit of the aircraft is broken by the catapulted parachute pack.

5. A method according to claim 2, characterized in that the transparency of the cockpit of the aircraft is broken by the catapulted parachute pack.

* * * * *